United States Patent
Legnetti et al.

(10) Patent No.: US 11,859,061 B2
(45) Date of Patent: *Jan. 2, 2024

(54) COLORANT AND ADDITIVE CONCENTRATE CARRIER SYSTEM WITH EFFICACY OVER A WIDE RANGE OF POLYMERIC PROCESSING TEMPERATURES

(71) Applicant: CHROMA COLOR CORPORATION, Lambertville, NJ (US)

(72) Inventors: Paul Legnetti, Lambertville, NJ (US); Eric D. Laird, Ewing, NJ (US); Luis Pacheco, Lambertville, NJ (US); Ronald M. Harris, Cumming, GA (US); Jeffrey S. Smink, Rockwell, NC (US)

(73) Assignee: CHROMA COLOR CORPORATION, Lambertville, NJ (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/367,758

(22) Filed: Jul. 6, 2021

(65) Prior Publication Data
US 2021/0332197 A1 Oct. 28, 2021

Related U.S. Application Data

(63) Continuation-in-part of application No. 16/354,986, filed on Mar. 15, 2019, now Pat. No. 11,053,361.

(51) Int. Cl.
| | | |
|---|---|---|
| *C08J 3/22* | (2006.01) | |
| *C08L 67/04* | (2006.01) | |
| *C08L 33/12* | (2006.01) | |
| *C08L 67/02* | (2006.01) | |

(52) U.S. Cl.
CPC .............. *C08J 3/226* (2013.01); *C08L 33/12* (2013.01); *C08L 67/02* (2013.01); *C08L 67/04* (2013.01); *C08J 2300/22* (2013.01); *C08J 2300/24* (2013.01); *C08L 2201/06* (2013.01)

(58) Field of Classification Search
CPC .... C08J 3/226; C08J 2300/22; C08J 2300/24; C08L 33/12; C08L 67/02; C08L 67/22–1/06
See application file for complete search history.

(56) References Cited

U.S. PATENT DOCUMENTS

| | | |
|---|---|---|
| 2,916,481 A | 12/1959 | Gilmont |
| 3,459,834 A | 8/1969 | Schmitt |
| 3,524,906 A | 8/1970 | Schmitt |
| 3,786,018 A | 1/1974 | Nadler |
| 3,837,773 A | 9/1974 | Raley |
| 3,846,360 A | 11/1974 | Needham |
| 4,167,503 A | 9/1979 | Cipriani |
| 4,320,212 A | 3/1982 | Liu |
| 4,404,248 A | 9/1983 | Spinelli |
| 4,511,687 A | 4/1985 | Nakanishi |
| 4,591,533 A | 5/1986 | Antonelli |
| 4,810,733 A | 3/1989 | Sakuma |
| 4,908,397 A | 3/1990 | Barsotti |
| 5,308,395 A | 5/1994 | Burditt |
| 5,449,557 A | 9/1995 | Liebler |
| 5,589,545 A | 12/1996 | Ramachandran |
| 5,973,032 A | 10/1999 | Caswell |
| 6,713,545 B2 | 3/2004 | Petiniot |
| 7,442,742 B1 | 10/2008 | Smink |
| 7,935,747 B2 | 5/2011 | Castanyer |
| 11,053,361 B2 * | 7/2021 | Legnetti ................ C08K 3/346 |
| 2002/0198122 A1 | 12/2002 | Nitzsche |
| 2003/0181575 A1 | 9/2003 | Schmidt |
| 2004/0214927 A1 | 10/2004 | Nitzsche |
| 2008/0058463 A1 | 3/2008 | Castanyer |
| 2008/0138627 A1 | 6/2008 | Nitzsche |
| 2008/0317990 A1 | 12/2008 | Runyan |
| 2009/0162683 A1 | 6/2009 | Douard |
| 2016/0017144 A1 | 1/2016 | Harris |
| 2017/0335099 A1 | 11/2017 | Carfagnini et al. |
| 2019/0194451 A1 | 6/2019 | Molenveld |
| 2020/0291193 A1 | 9/2020 | Legnetti et al. |

FOREIGN PATENT DOCUMENTS

| | | |
|---|---|---|
| CN | 101831099 | 9/2010 |
| CN | 102504599 | 6/2012 |
| CN | 112226057 | 1/2021 |
| EP | 0794222 | 9/1997 |

(Continued)

OTHER PUBLICATIONS

Extended European Search Report for Application 21194554.8, PCT/US2020/022527, dated Feb. 17, 2022, 8 pgs., European Patent Office, Germany.
International Searching Authority European Patent Office, International Search Report and Written Opinion for PCT/US2020/022527 dated Jun. 22, 2020.

*Primary Examiner* — Edward J Cain

(74) *Attorney, Agent, or Firm* — McDonald Hopkins LLC

(57) ABSTRACT

A concentrate carrier system for adding colorants and/or other additives to resin formulations over a broad range of processing temperatures is described. The carrier system includes at least 20 wt. % of a base acrylate copolymer, such as ethyl-methyl acrylate, provided in combination with less than 55 or less than 30 wt. % of a ring-opened cyclic ester or ether derivative, such as polycaprolactone, polyhydroxyalkonates, polyglycolide, polylactide, poly(butylene succinate), other aliphatic linear polyesters. The remainder, which may include an optional organic plasticizer such as epoxidized soybean oil, is dedicated to an additive package that may include colorants, property enhancers, and/or non-property fillers.

19 Claims, 2 Drawing Sheets

(56) References Cited

FOREIGN PATENT DOCUMENTS

| | | |
|---|---|---|
| EP | 2025702 | 5/2006 |
| EP | 1772478 | 4/2007 |
| JP | H05202234 | 8/1993 |
| JP | H11106573 | 4/1999 |
| JP | 2000248074 | 9/2000 |
| KR | 20110052528 | 5/2011 |
| WO | WO2002018487 | 3/2002 |
| WO | WO2007138120 | 12/2007 |
| WO | WO2008001684 | 1/2008 |
| WO | WO2009002653 | 12/2008 |
| WO | WO2011014528 | 2/2011 |
| WO | WO2014050580 | 4/2014 |
| WO | WO2017196176 | 11/2017 |

* cited by examiner

COLORANT AND ADDITIVE CONCENTRATE CARRIER SYSTEM WITH EFFICACY OVER A WIDE RANGE OF POLYMERIC PROCESSING TEMPERATURES

CROSS REFERENCE TO RELATED APPLICATIONS

This application is a continuation-in-part of U.S. patent application Ser. No. 16/354,986 filed on Mar. 15, 2019 and now granted as U.S. Pat. No. 11,053,361, which is incorporated by reference.

TECHNICAL FIELD

The present invention relates to non-liquid compositions and methods for introducing colorants and other additives to a variety of thermoplastic and/or thermosetting resins having a wide range of processing temperatures, from engineered polymers to common, lower-melting polymers.

BACKGROUND

Thermoplastic and thermosetting resin systems are used in a wide range of manufactured articles. Depending upon intended use, these systems need to meet certain structural and/or aesthetic requirements. Consequently, a variety of colorant and additive packages and concentrates exist to enable manufacturers to customize resin systems to their specific needs.

One challenge is that these colorant and additive packages must be compatible with the processing temperature inherent to the base resin. In this regard, industrial or "engineered" resin systems often require processing temperatures in excess of 200° C. Examples of such engineered plastics include styrene acrylonitrile (SAN), high-impact polystyrene (PS), acrylonitrile-butadiene-styrene (ABS), polybutylene terephthalate (PBT), polyethylene terephthalate (PET), polyoxymethylene (POM), polycarbonate (PC), thermoplastic polyether (TPE), thermoplastic polyurethane (TPU), various polyamides, and other known systems. The individual melt temperatures of each of these resins is known in the art and specifically disclosed herein. The comparatively high processing temperatures for these systems require concentrates that do not degrade or otherwise experience phase separation and plating at these temperatures.

In contrast, lower melting point polymeric compositions may be preferred based upon cost, equipment, ease of use, availability, and/or other requirements. These materials can typically be processed at temperatures between 95° to 175° C., and they encompass a wide range of compositions including (but not limited to) polyethylene (PE), such as peroxide- or moisture-crosslinkable polyethylene (XLPE) and other highly-substituted polyolefins, and lactones, such as polycarpolactone. Notably, these low temperature systems may include thermoplastic and thermosetting materials and, as above, their melt temperatures are specifically contemplated and disclosed herein.

In order to be an effective colorant or additive concentrate, the carrier resin for that concentrate must liquefy below the lowest end of the desired subset of base polymers (i.e., engineered resins and lower melting point resins) but otherwise remain viable (i.e., does not degrade) throughout the desired temperature range. Consequently, a number of "universal" carrier systems for pigments and other additives have been proposed that are provided in liquid form.

While these liquids can be effective carrier systems for colorants and additives in both high and low temperature resins, the use of liquids is challenging to formulators. Foremost, it is often difficult to introduce, evenly disperse, and retain the liquid among component blends that are primarily solid resin pellets. Examples of such a liquid carrier can be found in U.S. Pat. Nos. 4,167,503 and 5,308,395, as well as Chinese Publication CN102504599A.

Other solutions have been proposed. U.S. Pat. No. 3,846,360 describes a pigment carrier vehicle for resins melting in the range of 250° to 400° C., while a styrene-butadiene-styrene (SBS) block copolymer carrier is proposed for temperature above 230° C. in U.S. Pat. No. 6,713,545.

United States Patent Publication 2009/0162683 discloses a biodegradable polyester resin with 0.1 to 5 wt. % of metal alkyl sulfonate as an impact modifier. This allows the resultant material to remain substantially free of any glycerin fatty acid esters. However, this disclosure is limited to the use of polyesters as a base resin, and no consideration is given to colorants or additive packages.

Conversely, U.S. Pat. No. 4,810,733 discloses a color concentrate based upon polypropylene and polypropylene or polyethylene wax. Still other carriers and concentrate systems can be found in United States Patent Publications 2002/0198122 and 2004/0214927, as well as U.S. Pat. No. 7,935,747. Japanese Publications JPH5202234 and JPH11106573, as well as Patent Cooperation Treaty Publications WO2007/138120 and WO2011/014528 are also noteworthy.

As additional background, resin systems, equipment, and associated/relevant technologies which could be incorporated with a "universal" concentrate (i.e., a solid concentrate/carrier that can be used in both high and low temperature resins/formulations) are described in U.S. Pat. Nos. 2,916,481; 3,837,773; 3,786,018; and 5,589,545. Additionally, United States Patent Publications 2008/0317990 and 2016/0017144; Patent Cooperation Treat Publications WO2002/018487, WO2009/002653, and WO2014/050580; Japanese Publication JP2000248074; and Chinese Publication CN101831099 are all noteworthy. As seen in these publications, the coating of wires and cables is of particular interest insofar as regulations and standards place very specific conditions on the thickness, composition, and physical characteristics of these polymeric coatings.

SUMMARY

A carrier platform for colorants and/or other additives is described. The carrier includes a base acrylate copolymer used in combination with a ring-opened cyclic ester or ether derivative. In some embodiments, an optional organic plasticizer is provided in combination with an additive package that may include colorants, property enhancers, and non-property fillers. The resulting concentrate serves as a solid, universal concentrate, appropriate for adding to both low and high melting resin systems.

In a first embodiment, a solid concentrate carrier system for use in thermoplastic or thermosetting resin formulations is contemplated. The concentrate carrier system includes any combination of the following:

an acrylate copolymer comprising at least 20 wt. % of the concentrate;

a ring-opened cyclic ester or ether derivative, preferably formed as a linear aliphatic polyester element, comprising at least one of: polycaprolactone, polyhydroxyalkanoates or polyhydroxyalkonates (PHAs), polyglycolide, polylactide, poly(butylene succinate), and any of the foregoing optionally having one or more functional groups pendant thereto, said polycaprolactone element comprising less than 30 wt. % of the concentrate;
a plasticizer comprising between 0.5 and 30 wt. % of the concentrate;
an additive package comprising a remainder of the concentrate, said additive package including at least one selected from: colorants, property enhancers, and non-property fillers;
wherein the concentrate retains a solid form at ambient temperatures and the additive package remains viable in low melting resin systems and engineered resin systems at processing temperatures ranging from 90° C. or less up to at least 200° C.;
wherein the acrylate polymer includes ethyl-methyl acrylate copolymer;
wherein the acrylate copolymer is less than 50 wt. % of the concentrate;
wherein the plasticizer consists essentially of epoxidized soybean oil;
wherein the additive package is at least 50 wt. % of the concentrate;
wherein the additive package is at least 75 wt. % of the concentrate;
wherein only polycaprolactone is provided and said polycaprolactone is 5 wt. % or less of the total concentrate;
wherein only polycaprolactone is provided;
wherein the a ring-opened cyclic ester or ether derivative is selected from: polyhydroxyalkonates, polyglycolide, polylactide, and copolymers of lactone and one or more additional monomers;
wherein a ring-opened cyclic ester or ether derivative includes any of: (i) polymers of functionalized caprolactone, polymer of caprolactone, (ii) polymers functionalized lactone having a ring structure containing between 2 to 6 carbons within the ring structure, (iii) polymers of lactone having a ring structure containing between 2 to 6 carbons within the ring structure, (iv) copolymers of functionalized lactone having a ring structure containing between 2 to 6 carbons within the ring structure and at least one branched and/or straight chain aliphatic monomer having between 2 and 20 carbons in total, said monomers further containing optional carboxyl and/or hydroxyl functional groups, and (v) copolymers of lactone having a ring structure containing between 2 to 6 carbons within the ring structure and at least one branched and/or straight chain aliphatic monomer having between 1 and 20 carbons in total, said monomers further containing optional carboxyl and/or hydroxyl functional groups;
wherein, when present, the functionalized caprolactone and/or the functionalized lactone include at least one functional group selected from: carboxyl, hydroxyl, methyl, butyl, propyl, and isopropyl;
wherein the at least one monomer is one or more selected from methyl, butyl, propyl, and isopropyl structures;
wherein the additive package includes at least one selected from: organic and inorganic pigments, dyes, alumina, mica, perlescent effects, laser markers, and metallocene polyethylene;
wherein the additive package includes at least one selected from: zinc stearate, calcium-fatty acid, process modifiers, a mold release agent, a biocide, a UV stabilizer, a heat stabilizer, an anti-oxidant, a radical scavenger, an acid scavenger, an anti-static filler, and a conductive filler; and
wherein the additive package includes at least one selected from: calcium carbonate, clay, silica, talcum powder, rice husk ash, and ash.

In another embodiment, a solid concentrate carrier system for use in resin formulations having processing temperatures ranging from 90° C. or less up to at least 200° C. consists essentially of any combination of the following:
17.0 to 45.0 wt. % of ethyl-methyl acrylate copolymer;
3.0 to 5.0 wt. % of at least one selected from: polycaprolactone, polyhydroxyalkonates, polyglycolide, polylactide, and any of the foregoing optionally having one or more functional groups pendant thereto;
0.0 to 20.0 wt. % of plasticizer;
an additive package consisting of 2.0 to 30.0 wt. % (relative to the concentrate carrier system) of colorants, 0.8 to 18.5 wt. % (relative to the concentrate carrier system) of property enhancers, and 0.0 to 41.0 wt. % (relative to the concentrate carrier system) of non-property fillers;
wherein the plasticizer is provided between 0.5 to 20.0 wt. %;
wherein the plasticizer consists essentially of epoxidized soybean oil;
wherein the property enhancers consist of at least one selected from: a process modifier, a UV stabilizer, and an anti-oxidant;
wherein the process modifier is zinc stearate and/or calcium-fatty acid;
wherein the non-property filler is provided between 27.2 and 41.0 wt. %;
wherein the non-property filler consists essentially of calcium carbonate;
wherein the additive package only includes colorants and property enhancers; and
wherein the property enhancers are provided at or less than 1.3 wt. %.

Specific reference is made to the appended claims and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DETAILED DESCRIPTION

Figure 1:
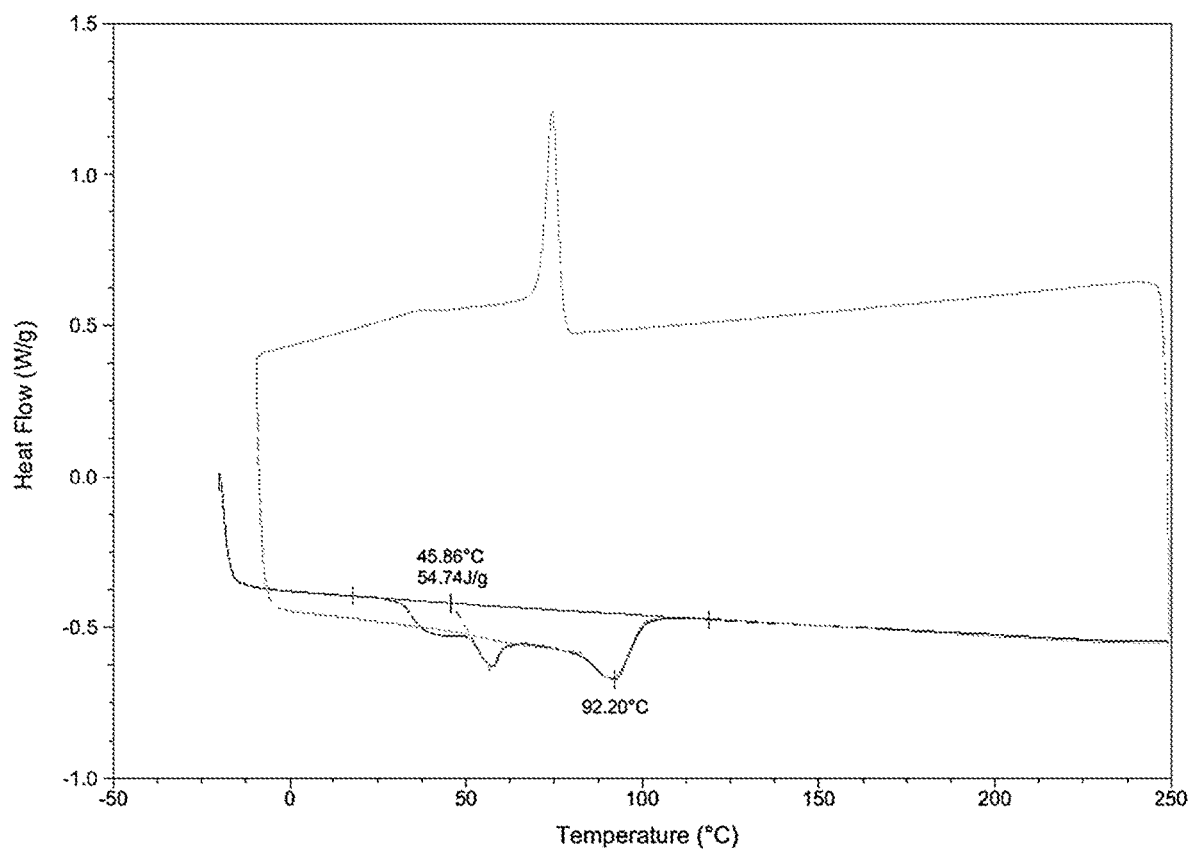
FIG. 1 is a differential scanning calorimetry (DSC) plot of the acrylate and ring-opened components of the pre-mix according to one aspect of the invention.

Reference may be made in detail to exemplary embodiments of the present invention, some of which are illustrated, exemplified, and/or described herein. Other embodiments and means of carrying out the invention can be utilized, encompassing various structural, compositional, and/or functional changes known to those having skill in this field, without departing from the intended scope. As such, the following description is presented by way of illustration only and should not limit these alternatives and modifications in any way.

As used herein, the words "example" and "exemplary" mean an instance or illustration but do not necessarily indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As noted above, there is a need for a solid composition that can serve as a platform to create concentrates or masterbatch-type compositions that can used be with equal efficacy in low-melting thermoplastic formulations and in combination with engineered resin systems. Manufacturers would welcome a concentrate system that could be used for all their needs. As used herein, the term colorant or additive concentrate refers to a solidified resin-based carrier system, formed from the pre-mix disclosed below (which may include an optional liquid plasticizer), and subsequently introduced as a solid into any number of low or high temperature resin formulations.

To that end, a pre-mix of an acrylate copolymer and a ring-opened polymeric cyclic ester or polymeric ether is created. Generally speaking, the acrylate comprises between 20 to 90 wt. % of the pre-mix, while the ring-opened component is provided at less than 30 wt. % of the pre-mix or in other embodiments at between 0.1 to 20 wt. %. The remainder includes the colorant and additive package, as well as an optional plasticizer that, when present, may form between 0.5 to 35 wt. % of the pre-mix.

Particular utility has been found in acrylates made from ethylene butyl-, ethyl-, and methyl-acrylate copolymers. Any combination (or single one) of these acrylates may be employed, although ethyl-methyl acrylate (EMA) copolymers are preferred in certain aspects. Other acrylate copolymers may be used, so long as the resulting component(s) provide relatively high temperature stability (in comparison to the pre-mix's other components). Preferably, this acrylate component (or, in aggregate, combination of components) comprises at least 20 wt. %, at least 30 wt. %, at least 40 wt. %, at least 50 wt. %, at least 60 wt. %, at least 70 wt. %, or at least 80 wt. % of the total pre-mix. Conversely, these components should be no more than 90 wt. %, no more than 80 wt. %, no more than 70 wt. %, no more than 60 wt. %, no more than 50 wt. %, no more than 40 wt. %, or no more than 30 wt. % of the total pre-mix. Additional limitations and parameters are encompassed by the examples appended hereto, all of which form part of this written disclosure.

Similarly, polycaprolactone and components based from the polycaprolactone ring structure are preferred as the ring-opened component. Polycaprolactone is particularly useful because of its broad Hansen interaction radius, wide availability, and relatively low cost (in comparison to other ring-opened polymeric esters and polymeric ethers. Certain substituted or functionalized derivatives of polycaprolactone and other cyclic ethers are also contemplated. While a nominal amount of ring-opened component(s) (i.e., at least 0.1 wt. % of the pre-mix) is needed, it should not exceed 30 wt. %. In further embodiments, maximum amounts of 1 wt. %, 5 wt. %, 10 wt. %, 15, 20, and 25 wt. % of polycaprolactone (or other aliphatic linear polyester or ring-opened components) are contemplated, as well as examples identified below. Notably, any of these stated intervals also can serve as the minimum end of an acceptable range. In some aspects, the aliphatic linear polyester might serve as a substitute for some or practically all of the acrylate (e.g., polylactide can replace ethyl-methyl acrylate).

While polycarpolactone is expected to have particular utility, it may be possible to substitute or augment its use with certain polycaprolactone derivatives (i.e., a ring-opened cyclic ester or ether derivatives). As noted above, these derivatives may have certain functional groups introduced along the carpolactone ring or cyclic ether ring. Three, four, five, and six member ring structures may be preferred for their availability and cost. Some examples of derivatives could include: polyhydroxyalkonates, polyglycolide, polylactide, and copolymers of lactone and one or more additional monomers. Poly(butylene succinate) is another useful substitute/derivative expressly embraced within this class for purposes of this application. All of the above can be separately characterized as aliphatic linear polyester elements. Polyesters having a melting point of 150° to 160° C. or less (and meeting the other criteria set forth herein) are expected to have particular utility as aliphatic linear polyester elements.

Thus, as used herein, "a ring-opened cyclic ester or ether derivative" and/or "aliphatic linear polyester elements" may embrace polymers of functionalized caprolactone and/or poly(butylene succinate), copolymers and one or more monomers, and/or polymers of those elements. In particular, the lactones of interest include ring structures containing 2, 3, 4, 5, or 6 carbons, with functional groups possibly appended to on e or more of these carbons. In certain embodiments, no functional groups are added to the lactone ring. When used, monomers for these derivatives are selected from branched and/or straight chain aliphatic structures having any whole number of carbon atoms between 1 to 20 within the structure. These base monomers may include any number of carboxylic or hydroxyl functional groups, as well as methyl, butyl, ethyl, and isopropyl structures (with or without carboxyl and/or hydroxyl functionalities). The functional groups for monomers can also serve preferred functional groups for polycaprolactone and/or lactone ring structures.

One advantage of certain aliphatic linear polyester elements relates to biodegradability. That is, over time, these polymers can degrade into smaller molecules, such as carbon dioxide, water, nitrogen, etc. under aerobic or anaerobic conditions, usually brought on by action of enzymes, microorganisms, or catalysts. Polycaprolactone, polylactide, and poly(butylene succinate) are particularly well known in this regard. As government regulations and general concern for polymeric waste continue to evolve, biodegradable concentrates and additives are expected to have particular utility in formulations and various manufactured products.

In some aspects, a plasticizer is provided to the pre-mix to wet the polymer surfaces, thereby lowering the processing temperatures required. For example, epoxidized soybean oil (ESO) can be added in an amount between 0.5 to 35 wt. % of the pre-mix, with additional minimum or maximum levels at 1.0 wt. %, 5 wt. %, 10 wt. %, 15 wt. %, 20 wt. %, 25 wt. %, and 30 wt. % also disclosed. Notably, while ESO and other plasticizers may be liquid when introduced during the manufacture of the pre-mix for the concentrate carrier system, the final concentrate carrier itself will be solid.

When used, the ESO may be mixed directly into the pre-mix or additive package blend. In some embodiments, the pre-mix and additive package are combined, although a split stream process could be used to separately melt the polymers and the additive package prior to forming the concentrate. Within this context, it will be understood the plasticizer relates to the processing of the pre-mix, and any desired characteristics to be delivered to the final formulation in which the concentrate is used would be properly considered as part of the property enhancers in the additive package itself. However, formulators may also opt to use a plasticizer, including ESO, in the low or high melting resin formulations enabled by the inventive carrier system.

That said, the additive package forms a significant aspect of the invention, insofar as the acrylate base and ring-opened component merely serve as a base resins carrier. Thus, within the confines of creating a stable, solid product, it is desirable to optimize and maximize the weight percentage of the additive package relative to the base resins carrier. In some embodiments, the additive package components comprise at least 0.1 wt. % and, more preferably between 45 wt. % to 55 wt. %, with the remainder of the mass of the pre-mix constituting base resins carrier (and plasticizer, to the extent a plasticizer is used). In some embodiments, the additive package approaches 80 wt. % of the total pre-mix. Additionally, the additive package may be 5 wt. %, 10 wt. %, 15 wt. %, 20, wt. %, 25 wt. %, 30 wt. %, 35 wt. %, 40 wt. %, 50 wt. %, 65 wt. %, 70 wt. %, and 75 wt. % the entire mass of the pre-mix.

The additive package itself may include one, two, or all three of: colorants, property enhancers, and non-property fillers. Each are familiar to those of skill in the art, and it will be understood that the items used in the additive package must be compatible with one another without degrading the final, intended purpose of the concentrate (both as a colorant or additive vehicle, as well as remaining in solid form for its universal use in low and high temperature resin formulations). Colorants are expected to have particular utility in certain aspects of the invention, and this disclosure expressly contemplates embodiments where colorants are the sole aim of the additive package or where the pre-mix is optimized for colorants such that colorant is the majority component in the additive package with only small amounts of process modifiers and/or anti-oxidants (less than 10 wt. % and, more preferably, less than 5 wt. % of the mass of the additive package).

Generally speaking, the colorants may be any combination of organic and inorganic pigments, dyes, alumina, mica, perlescent effects, laser markers, and/or metallocene polyethylene. To the extent these components are referenced or identified in any of the cited publications herein, such portions of those publications are incorporated by reference to further inform this disclosure. Additionally, specific examples are identified below, although these examples should not be taken as necessarily limiting this disclosure.

Property enhancers impart specific characteristics to the final thermoplastic formulations (rather than the pre-mix or concentrate carrier system itself). Thus, to the extent a property enhancer is included in the additive package of any claimed or disclosed embodiment, those properties are delivered to the formulation into which the concentrate is introduced. The properties of interest generally include process modifiers and mold release agents, as well as biocides, UV and light stabilizers, thermal/heat stabilizers, anti-oxidants, radical scavengers, acid scavengers and anti-static or conductive fillers. Combinations of these property enhancers can be included in any given concentrate formulation according to some aspects of the invention. As with the colorants, certain non-limiting examples are provided below.

Finally, non-property fillers can be used in the additive package. These fillers are not intended to alter the appearance or otherwise impart specific properties to the concentrate/final resin. Thus, unlike the colorants and property enhancers, these non-property fillers are intended to facilitate the formulation of the concentrate carrier system itself. Examples of non-property fillers appropriate to the invention include calcium carbonate, clays, silica, talcum powder, rice husk ash, and certain other, non-reactive types of ash. Reasons for relying on such non-property fillers may be related to controlling costs, improving the manufacture/processing of the carrier system, and/or ensuring the concentrate is sufficiently solid.

In one aspect of the invention, the additive package includes a small amount of metallocene polyethylene for facilitating the processing of certain portions of the additive package itself (in this context, the metallocene could be characterized as a non-property filler). The components of the additive package are pre-compounded in a twin screw extruder before being recombined downstream with the pre-mix polymer/plasticizer blend. In another embodiment, the additive package is mixed dry with the pre-mix polymers and plasticizer(s) and then coagulated in a melt to form the concentrate.

The additive package itself may consistent entirely of colorants. In other aspects, colorant(s) form the majority of the package, by weight percentage (i.e., at least 50 wt. %). Property enhancers and/or non property fillers may be added to the colorant(s). In some instances, the non-property fillers may constitute a majority of the package. Property enhancers will typically constitute no greater than 50 wt. % of the package. In preferred embodiments, colorants constitute at least 2.5 wt. %, at least 25.0% wt. %, and up to 95.8 wt. % of the additive package. When provided, non-proprety fillers may be anywhere from 50.0 to 60.0 wt. % of the package. Property enhancers may be from 2.0 wt. % up to 25.0 wt. % of the additive package.

In another aspect, the pre-mix polymers, plasticizer(s), and additive package will be combined on a two-roll mill, compounder, single- or twin-screw extruder, or Farrel continuous mixer. Combinations of these mixing approaches can also be employed. After mixing, the mixture is then run through a die or a shower head for pelletizing, or taken as a ribbon to be diced.

In this regard, the invention includes methods of making the carrier system, as well as formulations for that system. Still other aspects of the invention relate to the subsequent use of the carrier system in combination with low or high melt processing resins, as noted above.

As described, concentrates (including the additive package) formed in this manner provide advantages in comparison to existing so-called "universal" or multifunctional concentrates. In particular, the inventive concentrate can be incorporated into low-temperature resins, such as moisture-cure XLPE, while also being suitable for high temperature engineering resins, especially PC, ABS, and/or Nylon 6.

U.S. Pat. No. 7,442,742 describes a masterbatch composition relying on a metallocene polymer, while U.S. Pat. No. 9,969,881 and a currently copending continuing application (filed on Apr. 13, 2018 as U.S. Ser. No. 15/952,926 and now published as United States Patent Publication 2018/0258237) describe a split stream process for making such compositions. Certain aspects of these disclosures, including the formulations and methods of manufacture, may further inform aspects of the invention. As such, these documents are incorporated by reference in their entirety herein.

Finally, a range of publications describe polymer blends that might be particularly useful when employed in combination with certain aspects of the invention. These documents include: U.S. Pat. Nos. 3,459,834; 3,524,906; 4,320,212; 4,404,248; and 4,908,397, as well as German publications DE3518538 and DE 3662527 and Patent Cooperation Treaty publication WO 2008/001684.

In practice, use of the inventive concentrate could enable two shot manufacturing processes with a combination of differing resin systems (i.e., those whose processing temperatures differ by at least 20° C., at least 50° C., and up to at least 100° C.) while relying on the same concentrate platform. Further, owing to its adaptability over a large range of processing temperatures, the risk of degradation or loss of the concentrate (including the desired additive package) is reduced.

One significant aspect of the concentrate carrier system described and claimed herein is its ability to remain effective and viable across a broad range of temperatures. In turn, this means the concentrate can be incorporated into low or high temperature processes without fear of the concentrate degrading or failing to perform as intended. The viability of the concentrate can be verified by way of oxidation induction time and/or melt-separation tests, as well as known standards for thermogravimetric analysis, such as ASTM E1131, E2105, and the like. In general, the concentrate needs to retain its integrity and avoid carbon formation or separation during use. Final formulations exhibiting lumps, speckling, and/or other similar traits are indicative of a concentrate carrier system that has failed to melt within the formulation as intended/needed.

In other aspects, the ratios of components within the additive package, as well as the relative ratio of base resins (i.e., acrylate and polycaprolactone) to the entire additive package, are significant. Thus, all of the disclosed weight percentages herein may be further combined to form ratios in certain embodiments. In determining such ratios, the amount of plasticizer introduced to the pre-mix may be disregarded. In that same manner, the relative ratios of plasticizer, base resins, and additive package are contemplated and within these disclosed aspects.

EXAMPLES

Table 1 shows three exemplary formulations for the pre-mix and additive package according to certain aspects of the invention. All components identified with the exception of plasticizer are selected to be in solid, rather than liquid or gaseous, forms.

TABLE 1

| Concentrate formulations. All values expressed as wt. % of the total pre-mix. | | | |
|---|---|---|---|
| Component | Sample 1 | Sample 2 | Sample 3 |
| Acrylate | | | |
| Poly-EMA, 20% MA Ring-opened | 45 | 43.83 | 17 |
| Polycaprolactone, linear MW ~50 k Plasticizer | 5.0 | 4.87 | 3.0 |
| Epoxidized soybean oil (ESO) | 0.7 | 20 | 0.5 |
| Additive package | 48.3 (total) | 31.3 (total) | 79.5 (total) |
| Colorants | | | |
| in/organic pigment | 12.42 [1a] | 30 [2a] | 2.0 [3a] |
| dyes | — | — | — |
| alumina | — | — | — |
| mica | — | — | — |
| pearlescent effects | — | — | — |
| laser markers | — | — | — |

TABLE 1-continued

| Concentrate formulations. All values expressed as wt. % of the total pre-mix. | | | |
|---|---|---|---|
| Component | Sample 1 | Sample 2 | Sample 3 |
| Property enhancers | | | |
| Process modifier | 0.8 [1b] | 0.3 | 0.5 |
| Mold release agent | — | — | — |
| Biocide | — | — | — |
| UV stabilizer | — | — | 15.0 |
| Heat stabilizer | — | — | — |
| Anti-oxidant | — | 1.0 [2b] | 3.0 [3b] |
| Radical scavengers | — | — | — |
| Acid scavengers | — | — | — |
| Anti-static or conductive filler | — | — | — |
| Metallocene PE | — | — | — |
| Flame retardants | — | — | — |
| Non-property fillers | | | |
| Calcium carbonate | 27.2 | — | 41 |
| Clay | — | — | — |
| Silica | — | — | — |
| Talcum powder | — | — | — |
| Rice husk and other ash | — | — | — |

[1a] combination of C.I. pigments red (48:2) at 1.0%, blue (15:1) at 8.76%, black (7 at 70 nm) at 0.66%, and white (6) at 2.0%
[1b] 0.4% zince stearate and 0.4% calcium-fatty acid
[2a] C.I. pigment black (7)
[3a] C.I. pigment white (6)
[2b] and [3b] Irganox 1010

Sample 1 was mixed by hand and then melt compounded on a two-roll mill, with temperature set to 205° F. for the front roll and 130° F. for the back roll. Sample 1 was shown to provide uniform color at all tested quantities (up to 5 phr) in the following polymer resins: rigid and flexible polyvinyl chloride, XLPE, poly(vinylidene fluoride), high-density polyethylene, polypropylene, polyoxymethylene, ABS, general purpose- and high-impact PS, PC, Nylon 6, and TPE.

As a control experiment, a comparable concentrate based upon the teachings of U.S. Pat. No. 6,713,545 was created using a linear diblock copolymer of styrene and ethylene/propylene. This material remained rubbery at lower temperatures and was extremely difficult to compound below 280° F. It could not be compounded with XLPE, and plated when attempting to compound it with PVC.

Differential scanning calrimetry (DSC) of poly(ethylene-co-methyl acrylate), trade name Elvaloy AC1820, and polycaprolactone are shown in FIG. 1, showing that the melt temperature for this material is 92° C. (198° F.). The embodiment of the invention described above was tested in a melt flow indexer to demonstrate that it could be dispersed at this temperature using ASTM D1248, with the temperature set to 93° C. The melt flow index of this embodiment of the invention was found to be 0.01 g/10 min (2.16 kg, 93° C.). At 190° C., the melt flow of this material was found to be 2.38 g/10 min (2.16 kg).

Figure 2:
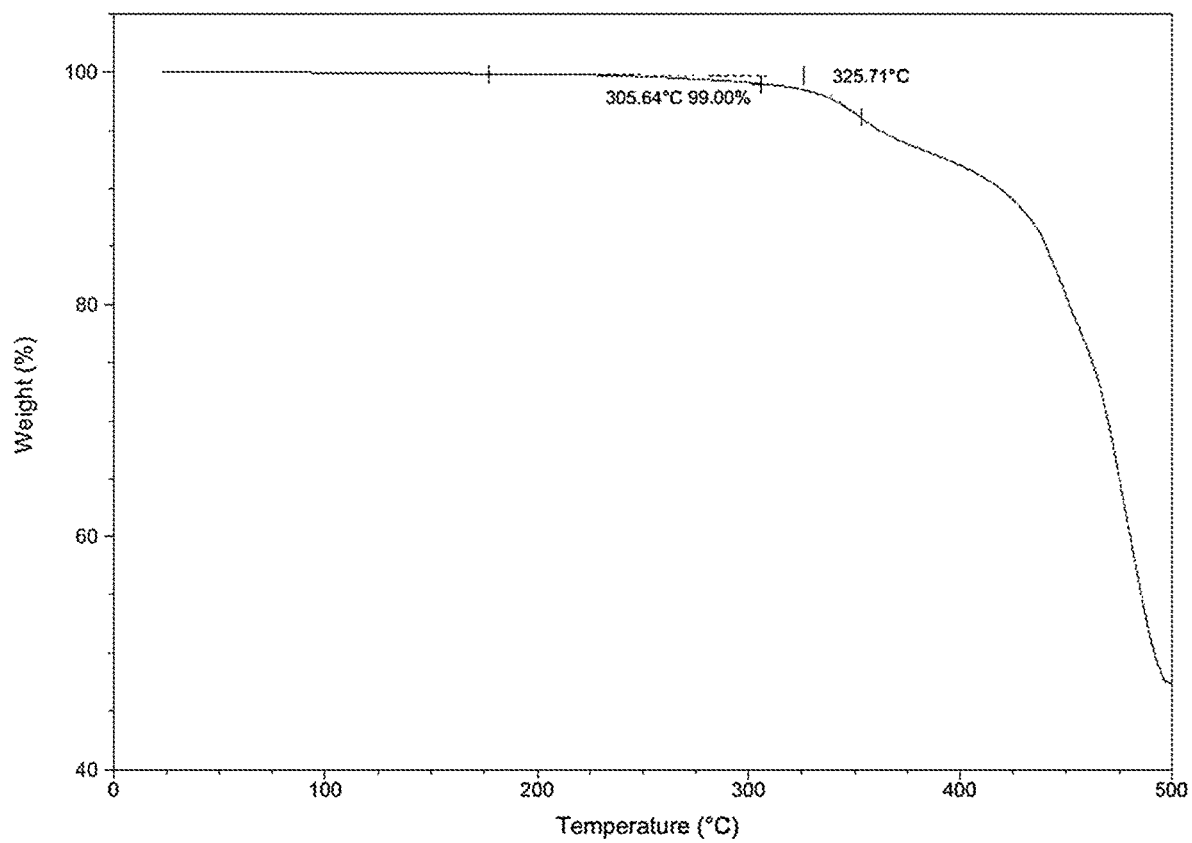
FIG. 2 is a thermogravimetric analysis (TGA) thermogram of one aspect of the invention.

FIG. 2 shows a dry air TGA thermogram of the above-represented embodiment of the invention. The temperatures of 1% mass loss at 305.6° C. (582° F.) and a minor degradation onset at 325.7° C. (618.3° F.). This is sufficient to allow the concentrate to be compounded with high temperature polymers that require the material to reach 600° F. for short periods, such as PC.

Sample 2 was produced using a Farrel continuous mixer and extruder system to produce pelletized industry-scale quantities. Sample 3 was produced using a two-roll mill as described above. Both Samples 1 and 3 maintained sufficient integrity and could be sectioned into uniform pieces from the solid mill sheet. Sample 2 could be pelletized using an underwater-cut pelletizing die.

Although specific embodiments have been illustrated, described, and/or exemplified in this specification, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A concentrate and carrier system for use in thermoplastic or thermosetting resin formulations, the concentrate comprising:
    an acrylate copolymer comprising at least 20 wt. % of the concentrate;
    a ring-opened cyclic ester or ether derivative comprising at least one of: polyhydroxyalkonates, polyglycolide, polylactide, poly(butylene succinate), and any of the foregoing optionally having one or more functional groups pendant thereto, said ring-opened cyclic ester or ether derivative comprising less than 30 wt. % of the concentrate;
    an additive package comprising a remainder of the concentrate, said additive package including at least one selected from: colorants, property enhancers, and non-property fillers; and
    wherein the concentrate retains a solid form at ambient temperatures and the additive package remains viable in low melting resin systems and engineered resin systems at processing temperatures ranging from 90° C. or less up to at least 200° C.

2. The concentrate of claim 1 wherein the acrylate polymer includes ethyl-methyl acrylate copolymer.

3. The concentrate of claim 1 wherein the acrylate copolymer is less than 50 wt. % of the concentrate.

4. The concentrate of claim 1 wherein the additive package is at least 50 wt. % of the concentrate.

5. The concentrate of claim 1 wherein the additive package is at least 75 wt. % of the concentrate.

6. The concentrate of claim 1 wherein the additive package includes at least one selected from: organic and inorganic pigments, dyes, alumina, mica, perlescent effects, laser markers, and metallocene polyethylene.

7. The concentrate of claim 1 wherein the additive package includes at least one selected from: zinc stearate, calcium-fatty acid, process modifiers, a mold release agent, a biocide, a UV stabilizer, a heat stabilizer, an anti-oxidant, a radical scavenger, an acid scavenger, an anti-static filler, and a conductive filler.

8. The concentrate of claim 1 wherein the additive package includes at least one selected from: calcium carbonate, clay, silica, talcum powder, rice husk ash, and ash.

9. A solid, biodegradable concentrate carrier system for use in thermoplastic or thermosetting resin formulations, the concentrate comprising:
    an acrylate copolymer comprising less than 20 wt. % of the concentrate carrier system;
    one or more aliphatic linear polyester elements selected from polycaprolactone, polyhydroxyalkonates, polyglycolide, polylactide, poly(butylene succinate), and any of the foregoing optionally having one or more functional groups pendant thereto, said aliphatic linear polyester element(s) cumulatively comprising less than 55 wt. % of the concentrate carrier system;
    an additive package comprising a remainder of the concentrate, said additive package including at least one selected from: a plasticizer, a colorant, a property enhancer, and a non-property fillers; and
    wherein the concentrate carrier system retains a solid form at ambient temperatures and the additive package remains viable in low melting resin systems and engineered resin systems at processing temperatures ranging from 90° C. or less up to at least 200° C.

10. The concentrate carrier system of claim 9 wherein the aliphatic linear polyester element(s) is between 17.0 to 45.0 wt. % of the concentrate carrier system.

11. The concentrate carrier system of claim 10 wherein the aliphatic linear polyester elements are one selected from: polylactide, polybutylene succinate, and either or both of the foregoing having one or more functional groups pendant thereto.

12. The concentrate carrier system of claim 11 wherein the acrylate copolymer is ethyl-methyl acrylate provided at less than 5.0 wt. % of the concentrate carrier system.

13. The concentrate carrier system of claim 9 wherein the acrylate copolymer is ethyl-methyl acrylate provided at less than 5.0 wt. % of the concentrate carrier system.

14. The concentrate carrier system of claim 9 wherein the aliphatic linear polyester elements are cumulatively less than 30 wt. % of the concentrate carrier system.

15. The concentrate carrier system of claim 9 wherein the aliphatic linear polyester element is polyhydroxyalkonates optionally having one or more functional groups pendant thereto.

16. The concentrate carrier system of claim 9 wherein the aliphatic linear polyester element is polyglycolide optionally having one or more functional groups pendant thereto.

17. The concentrate carrier system of claim 9 wherein the aliphatic linear polyester element is polylactide optionally having one or more functional groups pendant thereto.

18. The concentrate carrier system of claim 9 wherein the aliphatic linear polyester element is poly(butylene succinate) optionally having one or more functional groups pendant thereto.

19. The concentrate carrier system of claim 9 wherein the aliphatic linear polyester element(s) all have a melting point of 160° C. or less.

* * * * *